United States Patent [19]

Sasaki et al.

[11] Patent Number: 4,735,564
[45] Date of Patent: Apr. 5, 1988

[54] INJECTION MOLDING MACHINE

[75] Inventors: Yoshinari Sasaki; Etsuji Oda; Hirozumi Nagata; Naoki Kurita; Hiroyuki Maehara, all of Numazu, Japan

[73] Assignee: Toshiba Kikai Kabushiki Kaisha, Tokyo, Japan

[21] Appl. No.: 63,584

[22] Filed: Jun. 17, 1987

Related U.S. Application Data

[63] Continuation of Ser. No. 746,983, Jun. 19, 1985, abandoned.

[30] Foreign Application Priority Data

Jun. 25, 1984 [JP] Japan ................... 59-130786
Jun. 25, 1984 [JP] Japan ................... 59-130787
Jun. 25, 1984 [JP] Japan ................... 59-130788

[51] Int. Cl.$^4$ ............................ B29C 45/80
[52] U.S. Cl. ................... 425/145; 264/40.5; 425/171
[58] Field of Search ............... 425/135, 145, 143, 144, 425/149, 169, 171, 542; 264/40.1, 40.3, 40.5

[56] References Cited

U.S. PATENT DOCUMENTS 3,797,808  3/1974  Ma et al. ..................... 425/145
4,256,678  3/1981  Fujita et al. ................. 425/145
4,540,359  9/1985  Yamazaki .................... 425/135

Primary Examiner—Jay H. Woo
Assistant Examiner—Timothy W. Heitbrink
Attorney, Agent, or Firm—Koda and Androlia

[57] ABSTRACT

An injection molding machine generally comprises a heating cylinder, a screw rotated and reciprocated in the heating cylinder and a screw drive system. The screw drive system comprises two motors and two sensors connected respectively thereto which are automatically controlled by a control system in connection with a screw revolution number and a screw back pressure, or independently so as to accurately carry out the resin measuring process. The control system performs an adaptive control of a motion control system inclusive of the screw and the screw drive system in response to a screw speed instruction, a screw revolution number feedback signal, and a screw position feedback signal in accordance with various control modes.

11 Claims, 13 Drawing Sheets

BACK PRESSURE

REVOLUTION NUMBER

INJECTION MOLDING MACHINE

This is a continuation of application Ser. No. 746,983, filed June 19, 1985 now abandoned.

BACKGROUND OF THE INVENTION

This invention relates to an injection molding machine for controlling position, back pressure and speed of a screw disposed in a heating cylinder of the injection molding machine with high precision during a material resin measuring process and also relates to a method for controlling the injection molding machine for the same purpose.

In designing an injection molding machine particularly by taking the automatic operations or controls of the various steps into consideration, attentions should be paid to the improvement of quality of products, the energy-saving and the improvement of productivity, and these attentions should be paid particularly during the material resin measuring process. Regarding a point of the improvement of the quality of the products, since the quality thereof is mainly affected by the injection speed, pressure, resin temperature, injection amount and the like, it is required to measure a precise amount of the resin to be injected with high precision. Regarding a point of the energy-saving, the material resin in particle form fed into a heating cylinder of an injection molding machine is heated, sheared and kneaded therein by a screw to obtain an evenly molten resin and the energy required for the resin measuring stroke is minimized by effectively controlling the operation of the screw in conformity with the rate of revolution (called revolution number hereinafter), the back pressure of the screw, the kind or type of the resin and the temperature of the resin to be melted. Moreover, the productivity of the mold products can be achieved by minimizing the time interval required for the measuring process.

Generally, in an injection molding machine, a material resin is fed into a heating cylinder through a hopper and the resin fed into the heating cylinder is fed forwardly by rotating a screw. During this operation, the resin is heated by a heater such as heating coil located on the outer periphery of the heating cylinder and then sheared and kneaded by rotating the screw. When the resin fed into a space formed at the front end portion of the heating cylinder is injected into a mold through a nozzle formed at the front end of the heating cylinder, the screw is then slightly retracted by the pressure of the resin injected into the mold, thereby preventing the molten resin from flowing out outwardly. At this time, a back pressure is applied to the screw by a drive mechanism operatively connected to the screw thereby preventing the introduction of air into the heating cylinder through the nozzle and the hopper and measuring the resin amount precisely. Accordingly, the screw is gradually retracted by the pressure difference between the resin pressure and the back pressure applied by the drive mechanism. The revolution number and the back pressure of the screw are preset experientially by the kind and temperature of the resin to be used, and the position of the screw in the cylinder for determining the resin amount for injection is set by a detecting means such as a limit switch, which is disposed in the drive mechanism, as well as means for rotating the screw and means for applying the back pressure to the screw.

With a construction of the injection molding machine of conventional type described above, the position of the screw is detected by the limit switch and accordingly controlled indirectly by the relative relationships between the revolution number of the screw and the back pressure thereof. This involves such a problem that the screw may stop at a position beyond the desired stop position for the reason that the rotation of the screw is stopped after the operation of the limit switch. In order to obviate this defect in the prior technique there is no countermeasure other than to gradually slow down the rotation of the screw as the screw approaches the limit switch, or to set the operating point of the limit switch before the theoretical operating point by taking into consideration the excessive backward movement of the screw. For the reason described above, it is necessary in actual to determine the screw position during the resin measuring stroke by repeating the trials and errors. Furthermore, it is complicated to precisely set the operating point of the limit switch by external causes or disturbances such as kinds of resins to be used, shapes of molds, temperature variation, moisture of the resin and the variation of the resin amount fed from the hopper into the heating cylinder, thus being difficult to obtain the accurate resin amount for injection as well as the setting of the operating point of the limit switch. It is, therefore, impossible to evenly inject the resin into the mold and to prevent the degradation of the quality of the mold products. Moreover, in this conventional technique, it is obliged to unnecessarily reduce the revolution numbers of the screw even in the normal operation to stop the screw at the accurate position, thus being required for measuring the resin amount in a short time and obtaining high energy efficiency as well as the improvement of the rate of production. The vibration or overshoot of the screw in the resin measuring process due to the disturbances as described before adversely applies unnecessary compression or reduction of the pressure to the resin during the measuring process and causes the molten resin to be flowed out from the nozzle or reversely into the hopper. Accordingly, it is required to adaptively control the injection molding machine in response to the speed and position of the screw without affecting the behavior of the screw even in a variable operation of the control system of the injection molding machine.

SUMMARY OF THE INVENTION

An object of this invention is to provide an improved injection molding machine capable of controlling the drive mechanism thereof to accurately achieve the measuring process of the machine in combination with a revolution number and a back pressure of a screw means or independently.

Another object of this invention is to provide a method for accurately controlling a measuring process of the injection molding machine of the type described above by the adaptive control of a motion control system inclusive of a screw and a screw drive mechanism.

In one aspect, according to this invention, there is provided an injection molding machine of the type in which a material resin supplied to a hollow heating cylinder is heated and fed forwardly by a screw which is rotated and reciprocated in the heating cylinder by a drive mechanism, a resin melted and plasticized in the heating cylinder is injected into a mold, and a position of the screw and a revolution number thereof are detected by a detecting device, the injection molding machine being characterized in that the drive mechanism comprises a first electric motor for rotating the screw and a second electric motor for reciprocating the screw and that the detecting device comprises a first sensor operatively connected to the first motor for detecting the revolution number of the screw and transmitting a screw revolution number feedback signal and a second sensor operatively connected to the second motor for detecting the screw position and transmitting a screw position feedback signal, the first and second motors being controlled by a control system in which a signal for instructing a position of the screw, the screw revolution number feedback signal and the screw position feedback signal are inputted, the control system transmitting a screw rotation signal to the first motor and a screw back pressure signal to the second motor so that a deviation between the position instruction signal and the position feedback signal becomes substantially zero. The control system can be modified to have various control modes.

In another aspect of this invention, there is provided a method for controlling an injection molding machine in a resin measuring process in which a deviation between a screw speed adjusting input and a screw speed output is inputted to a speed loop gain element, a motion control system inclusive of a screw and a screw drive mechanism is controlled, and a screw speed instruction and a screw speed output are inputted into an adaptive control element connected to a gain element, and the method is characterized in that an output from the gain element to which the screw speed output is inputted is added to the speed instruction to obtain a screw speed adjusting input and a gain of the gain element is made variable in response to an output from the adaptive control element.

In a further aspect of this invention, there is provided a method for controlling an injection molding machine in a resin measuring process including a speed control system provided with a speed loop gain element to which a deviation between a screw speed adjusting input and a screw speed output is inputted, a motion control system to be controlled including a screw and a screw drive mechanism and a gain element, and the method is characterized in that there is provided an observing unit to which a screw speed instruction is inputted, the observing unit having the same characteristic as that of the speed control system, a predetermined gain is multiplied by a constant number to a deviation between the screw speed output and an output from the observing unit, and a deviation between the multiplied output and the screw speed instruction is obtained as a screw speed adjusting output.

As described above, according to this invention, the resin in the heating cylinder can be accurately measured by changing set signals for controlling the screw drive system with respect to external factors or disturbances such as kinds of resins to be used, shape of the mold, temperature, moisture of the resin and the like. The time required for achieving the measuring process can be reduced, and moreover, the productivity of the mold products can be highly improved with high quality.

The nature, principle and utility of the invention will become more apparent from the following detailed description when read in conjunction with the accompanying drawings.

DESCRIPTION OF THE PREFERRED EMBODIMENTS

Figure 1:
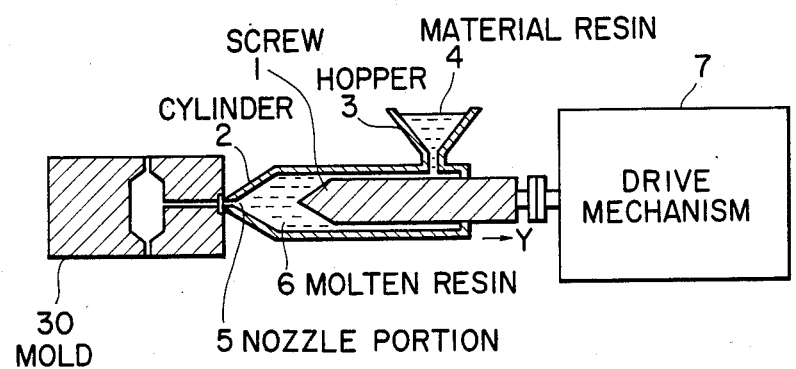
FIG. 1 is a schematic longitudinal sectional view of an injection molding machine of general type.

As conducive to a full understanding of the exact nature of this invention, general aspect of an injection molding machine of a conventional type and various problems ecountered in the known type will first be considered with reference to FIG. 1.

FIG. 1 shows a schematic longitudinal section of an injection molding machine of a general type in which a material resin 4 is fed to a heating cylinder 2 through a hopper 3 and then fed forwardly, i.e. leftwardly as viewed in FIG. 1, by the rotation of a screw 1 disposed in the heating cylinder 2. The resin 4 in the heating cylinder 2 is heated by a heater such as a heating coil (not shown) located on the outer periphery of the heating cylinder 2 and sheared and kneaded thereby to plasticize the resin. The thus obtained molten resin 6 is stored in a space formed at the front end portion of the heating cylinder 2 and then injected into a mold cavity of a mold 30 through a nozzle portion 5 of the heating cylinder 2. In this operation, since the front end of the nozzle 5 is pressed against the opening of the mold 30, the screw 1 is backwardly, i.e. in a direction of Y, moved by the pressure of the molten resin 6 once filled in the mold cavity. A drive mechanism 7 is operatively connected to the screw 1 in order to apply the back pressure to the screw 1 for preventing the molten resin 6 from flowing outwardly and from introducing air from the nozzle portion 5 and the hopper 3 into the cylinder 2 and for precisely measuring the resin amount in a resin measuring process. Thus, the screw 1 is gradually backwardly moved in the Y-direction by the pressure difference between the resin pressure caused by the screw rotation and the back pressure applied by the drive mechanism 7. With the injection molding machine of the type described above, the position of the screw for determining the amount of resin to be injected is set by a detecting means such as a limit switch located in the drive mechanism 7 in consideration of the kind of the resin to be used, the temperature thereof and the like.

However, a system or mechanism in which the limit switch detects and determines the screw position for the measuring stroke involves various problems such as described hereinbefore to accurately detect the screw position in the resin measuring process, and it is therefore required to provide an improved mechanism or apparatus and method for eliminating these problems.

Figure 2:
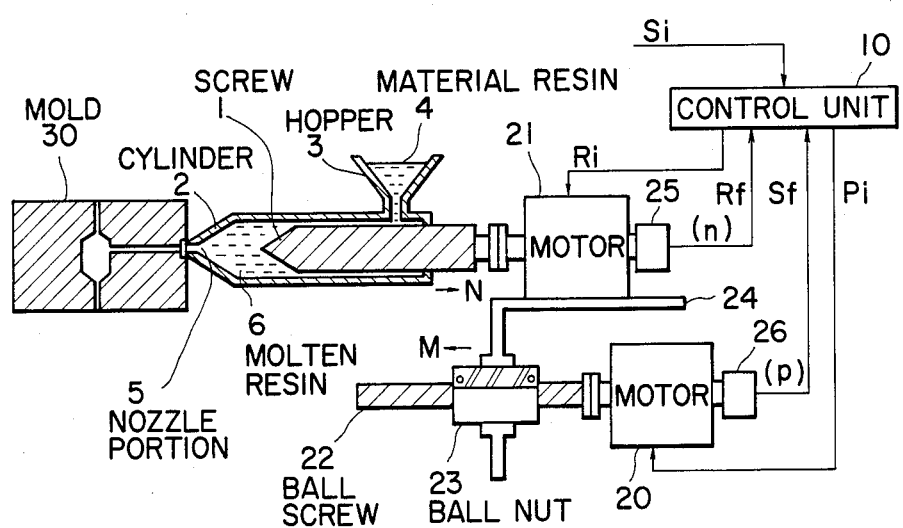
FIG. 2 is a schematic longitudinal sectional view of an injection molding machine according to this invention.

FIG. 2 shows a schematic block diagram of an injection molding machine, in which like reference numerals are assigned to elements corresponding to those shown in FIG. 1. In FIG. 2, an electric motor 21 is operatively connected to the screw 1 disposed in the heating cylinder 2 through a drive shaft. The motor 21 is settled on a drive table 24 which is connected to a ball nut 23 with which a ball screw 22 is engaged. The ball screw 22 is operatively connected to an electric motor 20 through a drive shaft thereof. A control unit 10 is operatively connected to the motors 20 and 21 through sensors 26 and 25, respectively. An instruction signal Si regarding the position of the screw 1 is inputted to the control unit 10 and the instruction signal Si is operated therein. A signal Pi regarding the operated back pressure of the screw 1 is transmitted to the motor 20 for shifting the screw position and a signal Ri regarding the operated revolution number of the screw 1 is also transmitted to the motor 21 for rotating the screw 1.

When the motor 21 is driven in response to the signal Ri, the screw 1 is rotated and the material resin 4 is fed into the heating cylinder 2 from the hopper 3. The resin is then sheared and kneaded by the advancement of the screw thereby to plasticize the resin, and when the heating cylinder 2 is filled with the plasticized or molten resin 6, the screw 1 is backwardly, i.e. in a direction of N, moved by the pressure of the stored molten resin. During this operation a back pressure is applied to the screw so as to precisely measure the resin amount without inducing air into the heating cylinder 2. A torque is generated, as a back pressure in a direction M with respect to a force for retracting the screw 1 and the motor 21 on the table 24 backwardly in the N-direction, by the ball nut 23 engaged with the ball screw 22 which is connected to the motor 20 which is driven in response to the signal Pi transmitted from the control unit 10. The sensor 25 connected to the motor 21 detects the revolution number n of the screw 1 and generates a screw revolution number feedback signal Rf to the control unit 10 and the sensor 26 connected to the motor 20 detects the position of the ball nut 23, i.e. the position of the screw 1, and generates a screw position feedback signal Sf representing the back pressure p to the control unit 10.

Figure 3:
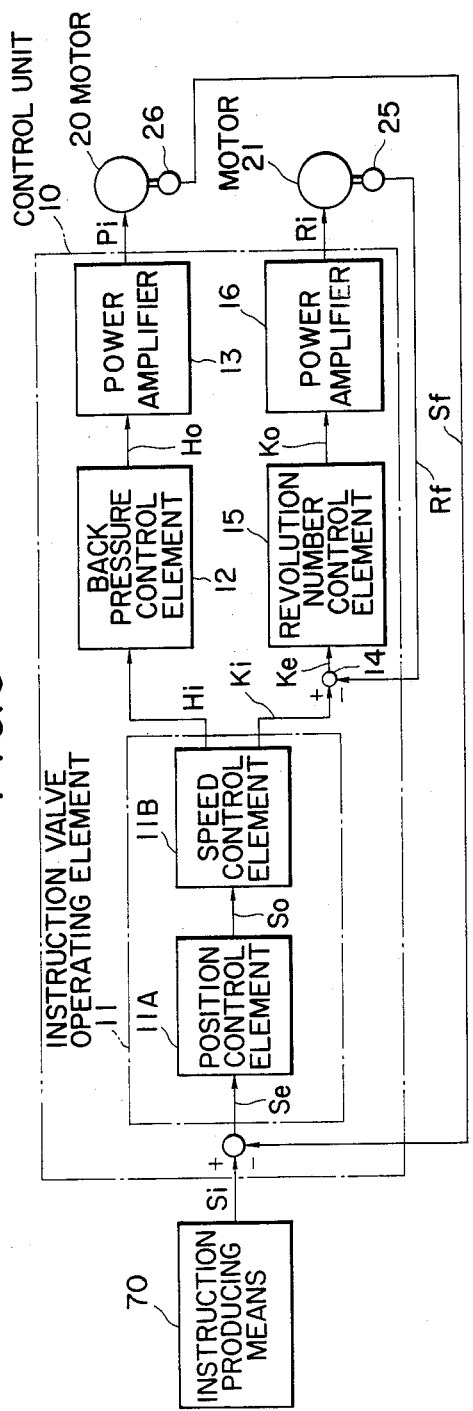
FIG. 3 is a block diagram showing one embodiment of a control system for the injection molding machine according to this invention.

FIG. 3 is a block diagram of the control unit 10 embodying the construction thereof. Referring to FIG. 3, a signal regarding deviation Se between the position instructionsignal Si from an instruction producing means 70 and the screw position feedback signal Sf is inputted into a position control element 11A constituting an instruction value operating element 11, and a signal So operated so as to compensate for the characteristics of closed loop control is inputted into a speed control element 11B also constituting the operating element 11. A back pressure instruction signal Hi and a revolution number instruction signal Ki required for controlling the screw 1 are transmitted from the speed control element 11B. The back pressure instruction signal Hi is inputted to a back pressure control element 12 from which a signal Ho operated for compensating for the characteristics of the closed loop control is then inputted to an electric power amplifier 13. The electric power is amplified by the amplifier 13 and a screw back pressure signal Pi is then inputted to the motor 20 for driving the same. While, the revolution number instruction signal Ki is inputted to a subtractor 14, and a signal regarding deviation Ke between the signal Ki and the revolution number feedback signal Rf obtained by the subtractor 14 is then inputted to a revolution number control element 15. An output Ko operated for compensating for the characteristics of the closed loop control is inputted to an electric power amplifier 16 to amplify the electric power and the screw rotation signal Ri is transmitted therefrom into the motor 21.

Figure 4:
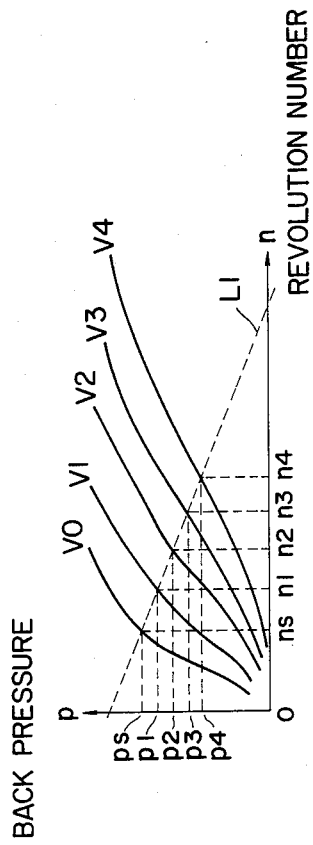
FIG. 4 is a graph showing characteristics between a revolution number and a back pressure of a screw of the injection molding machine in connection with FIG. 3.

FIG. 4 shows a graph for explaining the operation of the injection molding machine having the construction described hereinabove, in which an axis of quadrature designates a revolution number n of the screw 1 and an axis of abscissa designates a back pressure p of the screw 1, and characters V0 through V4 represent moving speeds of the screw 1 (V0: low speed; V4: high speed).

A series of operations of the resin measuring process with respect to the mold or molding machine 30 are explained hereunder with reference to FIG. 2.

Since the amount of the molten resin 6 to be measured is determined in accordance with the position at which the screw 1 stops, the position instruction Si inputted to the control unit 10 represents the amount of the resin 6. The measuring stroke is completed when the screw 1 moves till the position sensor 26 generates the screw position feedback signal Sf corresponding to the position instruction Si. The process for completing the measuring stroke will be described in conjunction with FIG. 3. When the deviation Se is inputted to the position control element 11A, the deviation Se is controlled so as to compensate for the closed loop characteristics with the predetermined frequency characteristics thereby to generate the signal So which is then inputted to the speed control element 11B. The speed control element 11B generates, in combination, the back pressure instruction Hi and the revolution number instruction Ki for controlling the screw to reduce the speed thereof to zero and to complete the measuring stroke. This will also be explained in connection with the graph of FIG. 4. At the start of the resin measuring stroke, the instructions Hi and Ki instruct the back pressure P4 and the revolution number n4 to obtain possibly high revolution number of the screw 1 to improve the measuring efficiency. In other words, the speed V4 of the screw 1 is determined by the relative difference between the movement thereof in the direction N and the back pressure in the direction M shown in FIG. 2, the speed V4 being relatively high speed. A broken line L1 in FIG. 4 shows a combined relationship between the revolution number n and the back pressure p which are variable in progress of the measuring process, and the inclination of this line L1 can be freely selected and set. The resin measuring process is started with the combination of the revolution number n4 and the back pressure p4 of the screw 1, which thereafter change as n3, p3; n2, p2; n1, p1, and finally ns, ps at which time the speed of the screw 1 becomes V0, and thereafter the screw 1 stops thereby to complete the resin measuring process. Namely, the revolution number ns and the back pressure ps become substantially zero when the screw speed approaches V0, and at the completion of the measuring stroke the screw 1 smoothly stops at the predetermined correct position in accordance with the position instruction Si without passing beyond the correct position. Thus, the correct amount of resin to be measured can be obtained and the back pressure p at this time can be selected to a desired value ps for the preparation of the next measuring stroke. In addition, by setting the revolution number n during the measuring process to a relatively high value, the frictional heat between the resin and the screw is increased, thus reducing the energy required for heating the cylinder 2.

Figure 5:
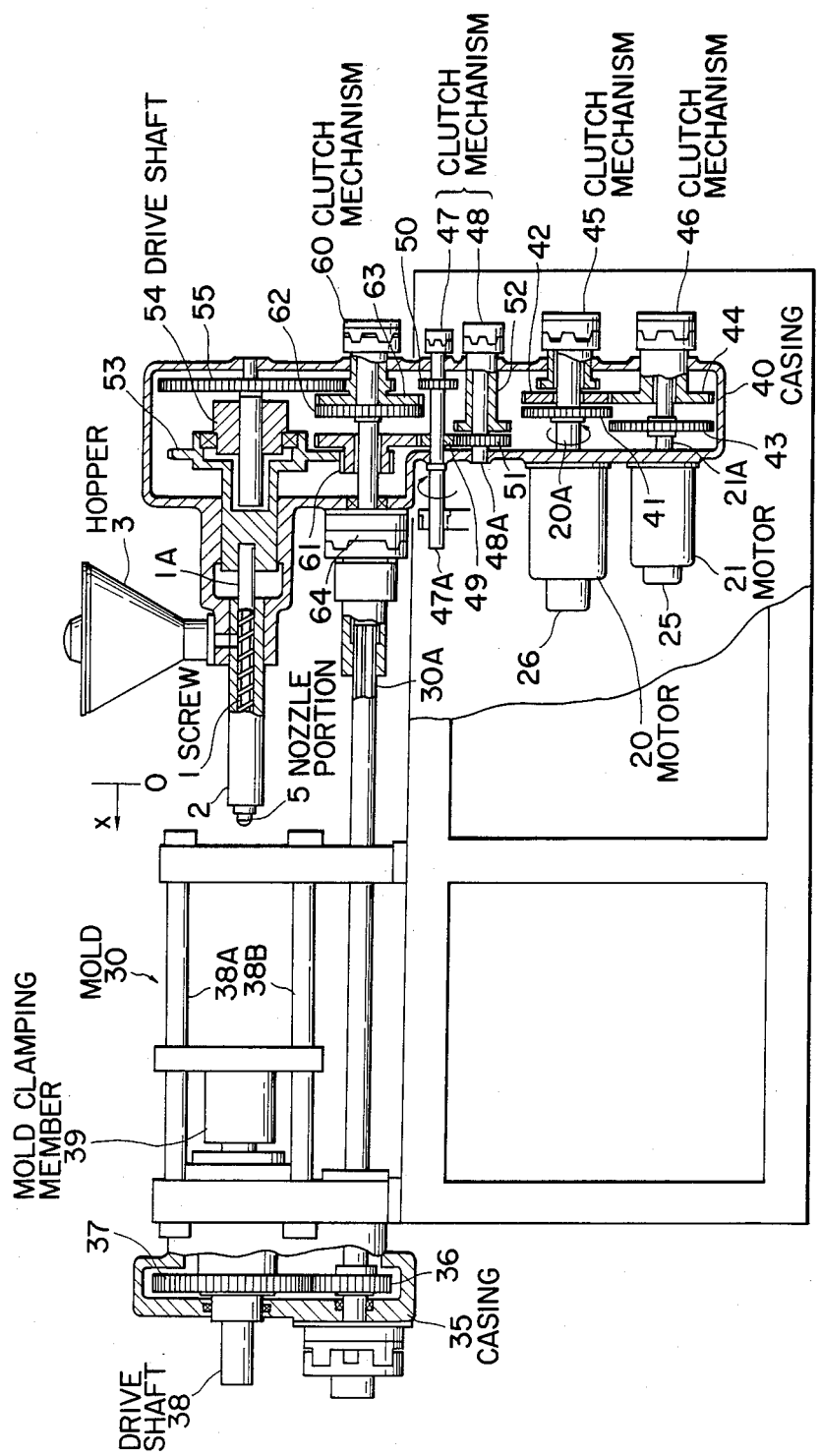
FIG. 5 is a longitudinal sectional view of the injection molding machine according to this invention.

FIG. 5 shows a detailed construction of an injection molding machine controlled on the basis of the control principle described hereinabove.

Referring to FIG. 5, electric motors 20 and 21 are attached to a casing 40 secured to an injection molding machine. Gears 41 and 42 are mounted on a rotation shaft 20A of the motor 20 and gears 43 and 44 are mounted on a rotation shaft 21A of the motor 21, respectively. These gears 41 through 44 act to transfer driving forces by clutch mechanisms 45 and 46 attached to the respective end portions of the rotation shafts 20A and 21A. To the casing 40 are rotatably supported transmission shafts 47A and 48A which act to transfer the driving forces by clutch mechanisms 47 and 48, and gears 49 and 50 and gears 51 and 52 are mounted on the transmission shafts 47A and 48A, respectively. The gears 49 and 50 are engaged with or disengaged from gears 61, 62 and 63 mounted on a drive shaft 30A by a clutch mechanism 60 attached to the end portion of the shaft 30A, which is rotatably supported by the casing 40 at one end portion thereby to transmit the driving force to a molding machine, i.e. mold 30 in FIG. 5, to move a mold clamping member 39. The other end portion of the drive shaft 30A is rotatably supported by a casing 35 of the mold 30. On the drive shaft 30A located in the casing 35 is mounted a gear 36 with which a gear 37 is engaged to transmit the driving force to a drive shaft 38 to move or slide the mold clamping member 39 on shafts 38A and 38B. A drive shaft 1A is located in the casing 40 and connected at one end thereof to a screw 1 disposed in a heating cylinder 2 of the injection molding machine, and a gear 53 is mounted on the shaft 1A. A gear 53 is further mounted on a drive shaft 54 which is connected through a bearing to an inside portion of the gear 53. According to the construction described above, the injection molding machine carries out various operations such as for clamping mold halves by moving forwardly the mold clamping member 39, increasing the clamping pressure, injecting and filling the molten resin into the mold 30, measuring and cooling the resin to plasticise the resin, moving backwardly the nozzle portion 5 of the heating cylinder 2, decreasing the mold clamping pressure, moving backwardly the mold clamping member to open the mold halves, and pushing out a molded product from the mold cavity. A series of these resin injection and molding operations are repeated to obtain molded products continuously.

Referring to FIG. 5 which shows a condition of an injection molding machine just before the injection molding operation, when it is required to clamp the mold halves and increase the pressure, the motor 20 is first driven to transmit the rotating force of the motor 20 to the drive shaft 30A through the rotation shaft 20A, the gear 41, the gear 51, the shaft 48A, the gear 52, the gear 50 and the gear 62 in this order. The rotation of the drive shaft 30A is transmitted to the drive shaft 38 through the gears 36 and 37 to rotate the same and thereby to move the mold clamping member 39 forwardly, i.e. rightwardly as viewed in FIG. 5. When the mold clamping member 39 stops at a predetermined stop position and the clamping pressure reaches a predetermined point, the clutch mechanism 64 is switched so as to cut off the power transmission through the gear 62 to the gear 36 and the clutch mechanisms 45 and 47 are switched to rotate only the shaft 47A thereby to move the casing 40 forwardly, i.e. leftwardly in FIG. 5, so that the nozzle portion 5 of the heating cylinder 2 approaches or is contacted to the opening of the mold 30. The nozzle portion 5, i.e. the casing 40, is retracted by reversely driving the motor 20.

When it is required to inject the molten resin into the mold, the motors 20 and 21 are driven to transmit the rotations of the gears 41 and 42 to the gears 62 and 63 through gears (not shown) by switching the clutch mechanisms 45 and 46, respectively, thereby to transmit the rotations of the gears 62 and 63 to the gear 55 by switching the clutch mechanism 60. The rotations of the motors 20 and 21 are transmitted to the drive shafts 54 and 1A through the gear 55 thereby to forwardly move the screw 1, thus injecting the molten resin in the heating cylinder 2 into the mold 30 through the nozzle portion 5. When it is required to carry out the measuring of the resin, only the motor 21 is driven so that the rotation of the motor 21 is transmitted to the screw 1 through the gear 43, a gear (not shown), the gear 52, the shaft 48A, the gear 51, the gear 49, the gear 61 and the gear 53. In synchronism with this operation of the motor 21, the motor 20 is also driven so that the rotation of the motor 20 is also transmitted to the screw 1 through the gear 42, a gear (not shown), the gear 62, the clutch mechanism 60, the gear 55, the shaft 54 and the shaft 1A to apply the back pressure to the screw 1 and to measure the resin amount.

The mold halves of the molding apparatus 30 are opened by retracting the mold clamping member 39 by driving the motor 20 reversely to the manner described with reference to the mold clamping operation.

The detail of the construction and the operation of the control unit 10 in FIG. 3 will be described hereunder in conjunction with FIGS. 6 through 16.

Figure 6:
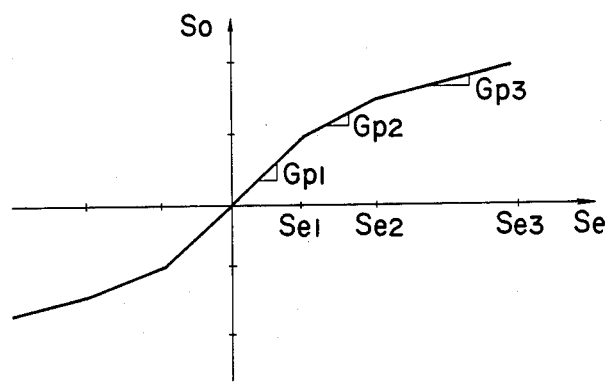
FIG. 6 is a graph showing one example of a function which is generated by a position control element in FIG. 3.
Figure 7:
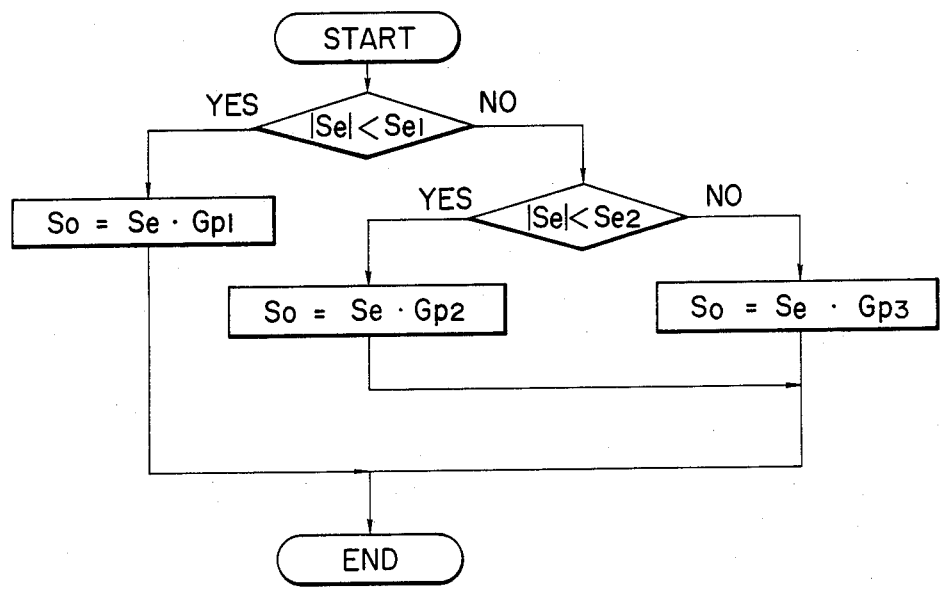
FIG. 7 is a flow chart showing operation of the position control element.
Figure 8:
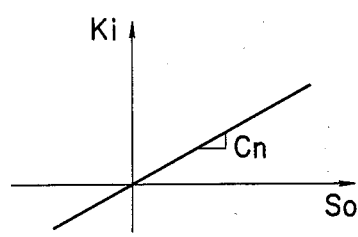
FIGS. 8, 9 and 11 are graphs showing one example of functions which are generated by a speed control element in FIG. 3.
Figure 9:
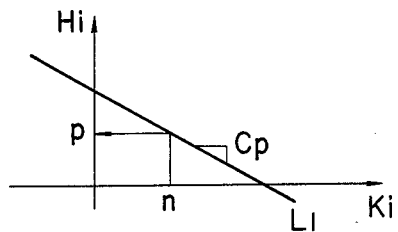
Figure 10:
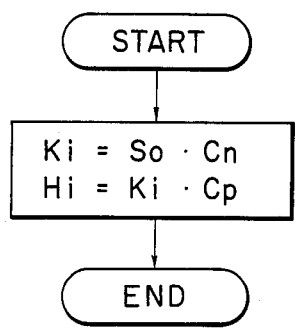
FIGS. 10 and 12 are flow charts showing operation of the speed control element.
Figure 11:
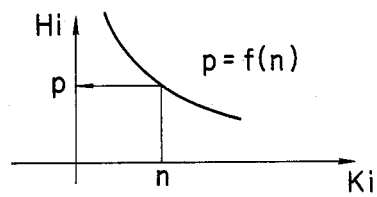
Figure 12:
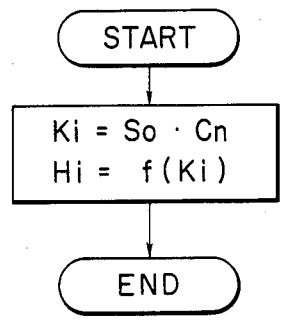
Figure 13:
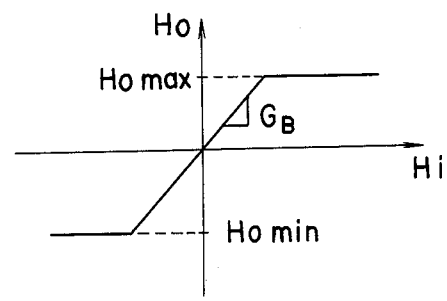
FIG. 13 is a graph showing one example of a function which is generated by a back pressure control element in FIG. 3.
Figure 14:
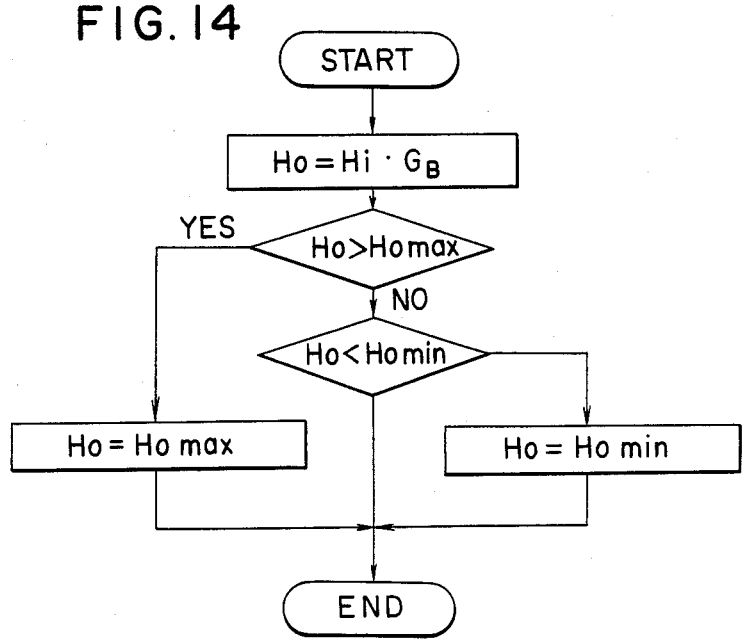
FIG. 14 is a flow chart showing operation of the back pressure control element.
Figure 15:
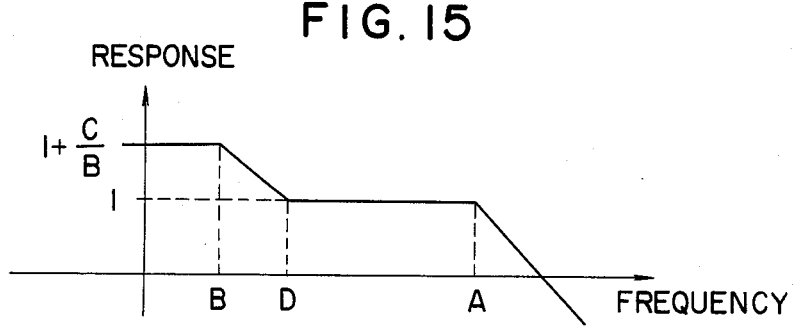
FIG. 15 is a graph showing one example of a function which is generated by a revolution number control element in FIG. 3.
Figure 16:
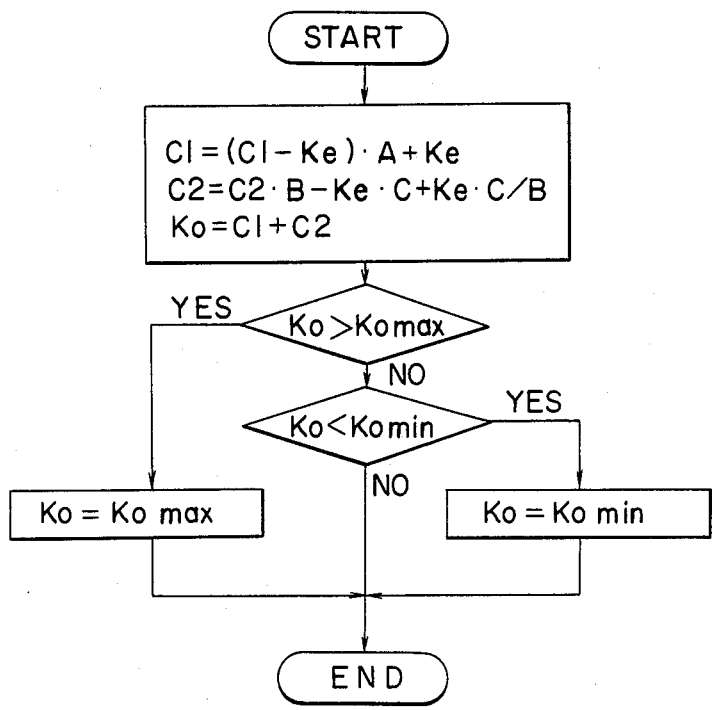
FIG. 16 is a flow chart showing operation of the revolution number control element.

A signal So generated by the position control element 11A is shown in FIG. 6. In FIG. 6 $G_{P1}$, $G_{P2}$ and $G_{P3}$ denote position control loop gains and the position control element 11A operates in accordance with a flow chart of FIG. 7. The signal So is inputted to the speed control element 11B and then converted to the revolution number instruction signal Ki as shown in FIG. 8 and the back pressure instruction signal Hi having a relationship as shown in FIG. 9. In this case, the speed control element 11B operates in accordance with a flow chart of FIG. 10. FIG. 11 shows another relation between the revolution number instruction signal Ki and the back pressure instruction signal Hi, and the speed control element 11B operates as shown in FIG. 12. FIG. 13 is a graph showing one example of the signal Ho as a function which is generated by the back pressure control element 12 and the operation thereof is shown in a flow chart of FIG. 14. In FIGS. 13 and 14, $G_B$ denotes back pressure control gain, and Homax and Homin represent back pressure maximum and minimum, respectively. Further, a response of the revolution number control element 15 is shown in FIG. 15 and the operation thereof is shown in a flow chart of FIG. 16. In FIGS. 15 and 16, A, B, C and D are parameters, respectively and parameter D is given as $D = \{A(B+C)\}/(A+C)$, C1 and C2 are variables and Komax and Komin are command signals corresponding to maximum and minimum revolution numbers.

Figure 17:
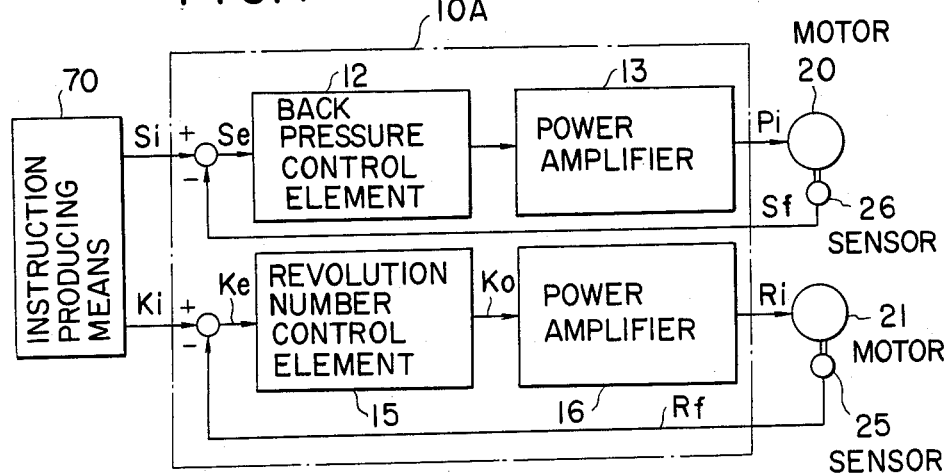
FIG. 17 is a block diagram showing another embodiment of a control system according to this invention.

FIG. 17 shows another embodiment of the control unit 10 according to this invention, in which like reference numerals are assigned to elements corresponding to those shown in FIG. 3. The deviation Se between the position instruction Si and the screw position feedback signal Sf is directly inputted to the back pressure control element 12 and a screw back pressure signal Pi is then transmitted from the electric power amplifier 13 connected to the control element 12 operatively to drive the motor 20 and control the screw position. The revolution number instruction Ki instructs independently a constant value, and the deviation Ke between the instruction Ki and the screw revolution number feedback signal Rf is inputted to the revolution number control element 15. The electric power amplifier 16 transmits a screw revolution signal Ri in response to the signal Ko from the control element 15 thereby to drive the motor 21.

Figure 18:
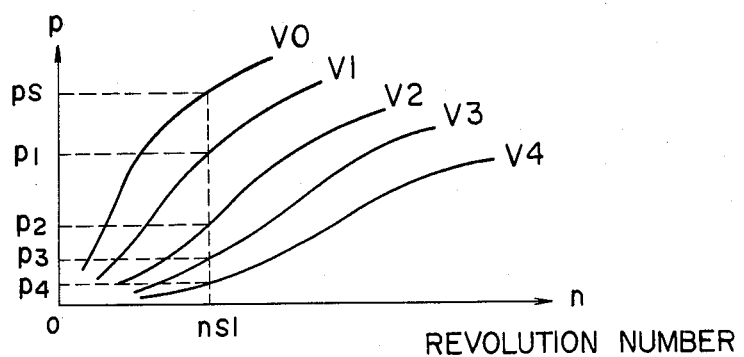
FIG. 18 is a graph showing characteristics similar to FIG. 4 in connection with FIG. 17.
Figure 19:
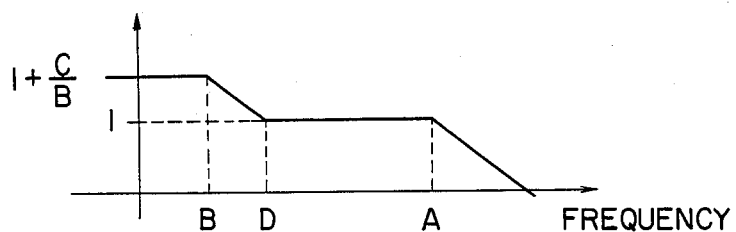
FIG. 19 is a graph showing one example of a function which is generated by a back pressure control element in FIG. 17.
Figure 20:
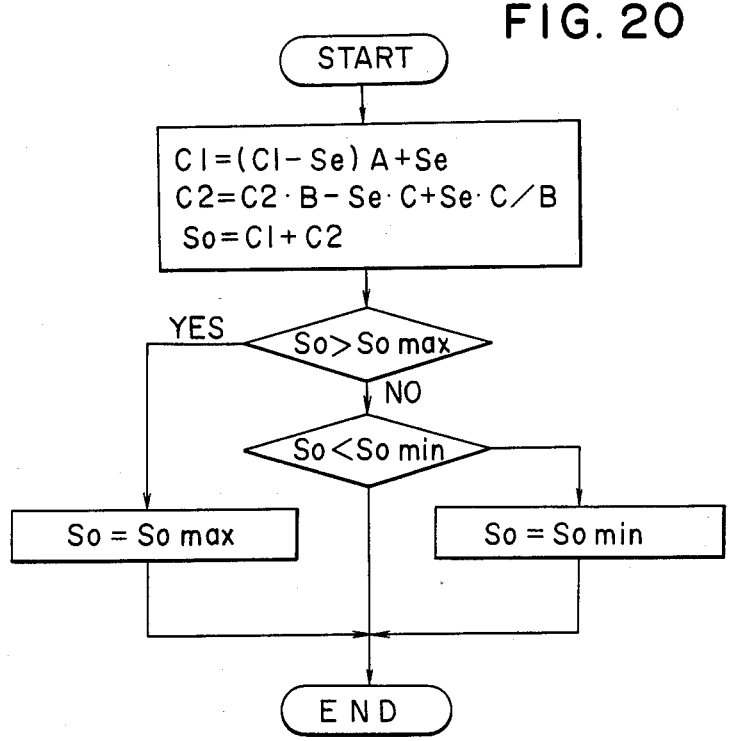
FIG. 20 is a flow chart showing operation of the back pressure control element.

FIG. 18 shows a graph similar to FIG. 4 in connection with the embodiment shown in FIG. 17. According to FIG. 18, the revolution number n of the screw 1 is represented as a constant value nS for the reason that the revolution instruction Ki is a constant value. Regarding the back pressure P, the signal regarding the deviation Se between the position instruction Si and screw position feedback signal Sf takes a large magnitude at the starting point of the resin measuring process, and the back pressure control element 12 is provided with a gain in inverse proportion to the deviation signal Se and with a predetermined frequency characteristics thereby to compensate for the closed loop characteristics. For this reason, the measuring process is first started with a relatively low back pressure p4 and at a relatively high speed V4 to speed up the measuring process. As the magnitude of the deviation Se gradually reduces, the back pressure p of the screw 1 increases accordingly, as p3→p2→p1 and the screw moving speed V decreases gradually as V3→V2→V1 as shown in FIG. 18. When the back pressure reaches ps, the screw moving speed approaches nearly zero and the screw reaches the position actually predetermined by the position instructions Si at which the screw stops and the measuring stroke is completed. The injection process is then started at this position. Accordingly, since the screw moving speed decreases gradually, the screw can be stopped at an exact position with high precision, thus the amount of the resin being accurately measured.

Figure 21:
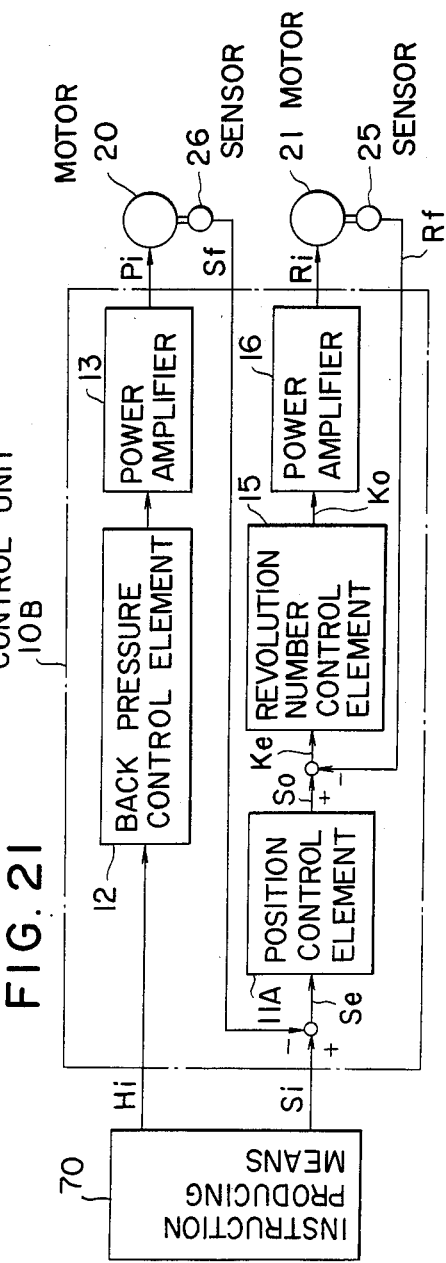
FIG. 21 is a block diagram showing a further embodiment of a control system according to this invention.

FIG. 21 shows a further embodiment of the control unit as reference numeral 10B according to this invention, in which like reference numerals are assigned to the elements corresponding to those shown in FIG. 3. The signal of the deviation Se between the position instruction Si and the screw position feedback signal Sf is inputted to a position control element 11A in substantially the same manner as that referred to hereinbefore with respect to FIG. 3, but an output signal So from the control element 11B is subtracted from the screw revolution number feedback signal Sf, and a signal Ke regarding the deviation therebetween is directly inputted to an revolution number control element 15. An output Ko from the control element 15 is then inputted to the motor 21 as an output Ri through an electric power amplifier 16 thereby to rotate the screw 1 and then stop it at the predetermined position in accordance with the position instruction Si. During the resin measuring stroke of the screw, the back pressure instruction Hi is always maintained at a constant value and the instruction Hi is inputted to the back pressure control element 12 and then to the motor 20 through an electric power amplifier 13 as an output Pi thereby to give a torque to the screw 1 so as to generate a constant back pressure ps.

Figure 22:
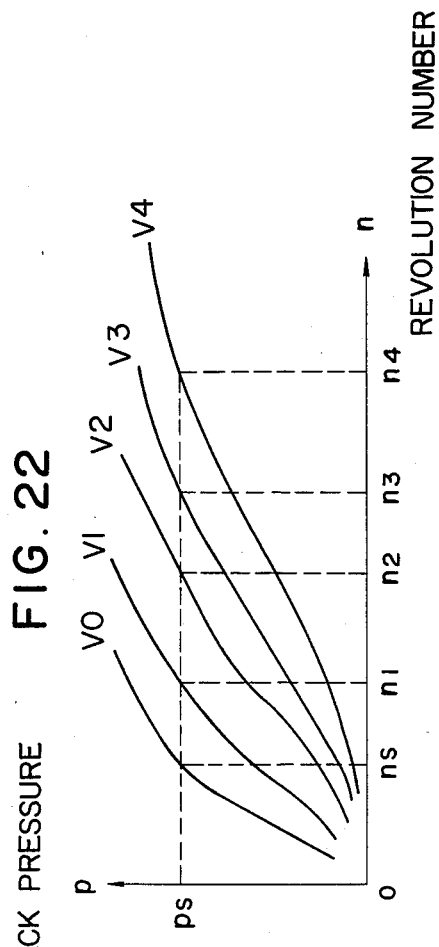
FIG. 22 is a graph showing characteristics similar to FIG. 4 or 18 in connection with FIG. 21.

FIG. 22 shows a graph similar to that shown in FIG. 4 or FIG. 18. According to FIG. 18, the back pressure p is represented as a constant pressure ps during the resin measuring process, and the screw 1 is rotated at a high revolution number n4 initially in accordance with the signal of the large positional deviation Se and the revolution number n is then reduced as n3→n2→n1 as the deviation Se decreases. When the screw 1 approaches the predetermined position in accordance with the position instruction Si, the revolution number decreases to ns, the screw moving speed also decreases to Vo which is nearly zero and the screw 1 stops at the predetermined position exactly, thus the measuring process being completed. Accordingly, the revolution number n is determined to be high initially at the measuring stroke and decreases gradually to accurately stop the screw at the position determined by the position instruction Si, so that the time required for the measuring process can be reduced and the screw can be stopped at the predetermined position thereby to accurately measure the resin amount.

Consequently, according to the injection molding machine of this invention, the resin measuring process can be performed by changing set signals regardless of the external factors or disturbances such as kinds or types of the resin to be used, shapes of the molds, the temperature changes, the resin temperature and the like. In addition, since the resin measuring time intervals can be reduced, the productivity of the molded products can be achieved with high energy efficiency, and moreover, the quality of the molded products can also be improved.

As described hereinbefore, although the position of the screw 1 is controlled by the revolution number of the screw and the back pressure thereof, since various operational conditions such as changes in temperature, moisture, plasticizing condition and feeding amount of the resin in the resin measuring process act as external disturbances, dynamic characteristics of the screw 1 may be deviated from those preliminarily set, and even if the screw position is finally controlled to the position determined by the position instruction Si, the screw would be vibrated or overshot during the measuring process. These phenomena may be adversely resulted in application of unnecessary compression of the resin, pressure reduction of the resin, resin flow-out from the nozzle portion 5, or resin reverse flow into the hopper 3. Accordingly, it is required to control the position and speed of the screw without affecting the dynamic characteristics of the screw 1 during the measuring stroke even if various parameters for the operation are changed or varied.

Figure 23:
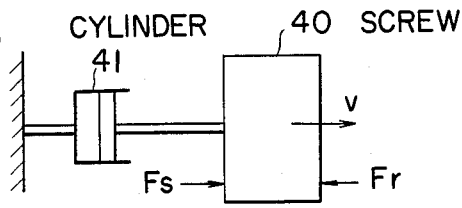
FIG. 23 is a modeled view of a dynamic system for explaining the control principle according to this invention.
Figure 24:
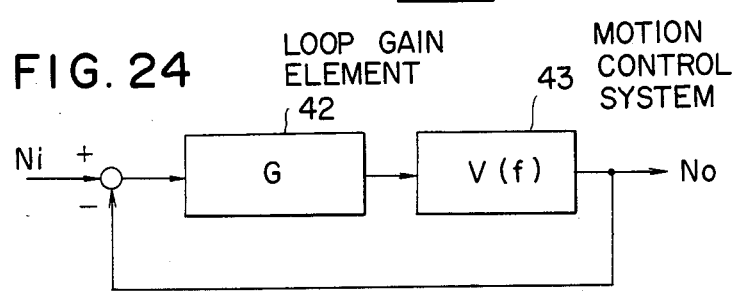
FIG. 24 shows a block diagram in which the control system shown in FIG. 3 is represented with speed as a base.

These requirements will be satisfied by this invention on the basis of the control principle represented and explained by FIGS. 23 and 24. Referring to FIG. 23, supposing that the screw 40 is moved leftwardly at a speed v in a cylinder 41 which is caused by force difference f between forces Fs and Fr applied to the screw 40 from the left and right sides of the screw, an equation of motion at this time is converted by the Laplace transformation thereby to obtain a transfer function V(f) in a motion control system which is represented as:

$$\frac{No}{Ni} = \frac{G}{Ms + D + G} \quad (2)$$

wherein
M: Inertial mass and
D: Viscocity coefficient due to resin, for example.

FIG. 24 is a block diagram showing a system of a speed control loop, such as shown in FIG. 3, constituting a motion control system 43 of the type described above (function V(f)) and a speed loop gain 42 (gain G). A feedback signal of this system is obtained as a speed signal by differentiating the signal from the position sensor 26 for the screw, so that the control system as shown in FIG. 24 can be thus constituted as the screw speed is the base of the system. The relationship between a speed input instruction Ni and a speed output No in FIG. 24 is calculated as follows by applying the equation (1) to the motion control system 43.

$$V(f) = \frac{v}{f} = \frac{1}{Ms + D} \quad (1)$$

Figure 25:
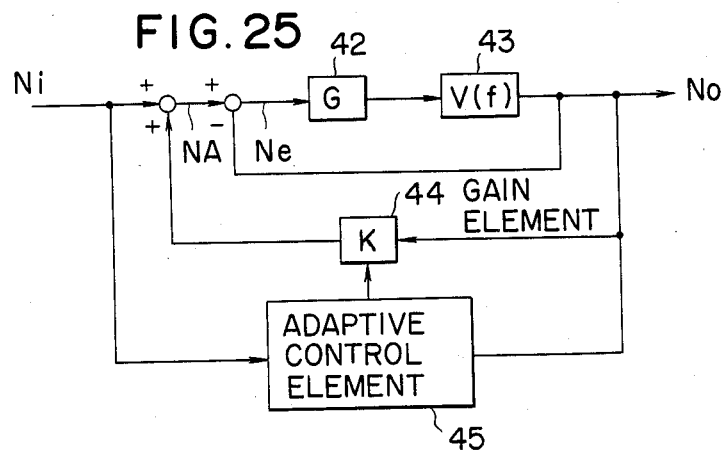
FIG. 25 is a block diagram for explaining one embodiment of a control method according to this invention.

FIG. 25 is a block diagram showing one example of the control system shown in FIG. 3, in which the speed output No is fed back to the input in relation to a screw speed adjusting input NA and the deviation Ne between the output No and the input NA is inputted into the speed loop gain 42, the speed of which is then inputted into the motion control unit 43. The output No is also fed back to the input through a gain element 44, a gain K of which is made variable by an adaptive control element 45 into which the speed instruction Ni and the output No are inputted for the adaptive control. With the control system shown in FIG. 25, the speed instruction Ni and the speed output No are related and calculated as follows:

$$\frac{No}{Ni} = \frac{G}{Ms + D + G - G \cdot K} \quad (3)$$

When the preset screw speed instruction Ni is inputted, the screw 1 is moved at a speed No, but at this time when the viscosity efficiency D of the molten resin 6 is changed to $D+\Delta D$, the denominator of the equation (3) changes to:

$$Ms + D + G + (\Delta D - G \cdot K) \quad (4)$$

Accordingly, under the condition of $\Delta D = G \cdot K$, i.e.

$$K = \Delta D / G \quad (5)$$

the equation (3) equals to the equation (2) and the variation $\Delta D$ of the viscosity caused by a certain reason can be countervailed. Thus, the gain K of the gain element 44 is determined by the equation (5), when the variation $\Delta D$ is obtained, thereby to compensate for the variation of the viscosity coefficient in the screw unit. Since the variation $\Delta D$ is varied by an external function such as temperature, the variation $\Delta D$ should be directly measured by any specific method or any suitable method. One method for obtaining the variation $\Delta D$ based on an actual measurement will be described hereunder. A step response is first obtained by inputting a step signal as a speed input with reference to the equatio (2) and the obtained response is converted into an inverse Laplace transformation as a following equation g(t):

$$g(t) = \alpha^{-1}\left(\frac{1}{s} \cdot \frac{No}{Ni}\right)$$

$$= \alpha^{-1}\left(\frac{G}{s(Ms + D + G)}\right)$$

$$= \frac{G}{D + G}\left\{1 - \exp\left(-\frac{D + G}{M}\right)t\right\}$$

Figure 26:
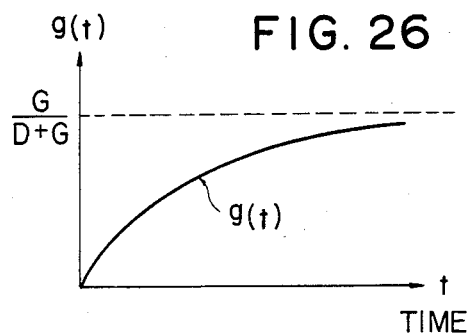
FIG. 26 is a step response graph to be used for the characteristic measurement of the control system shown in FIG. 25.

This g(t) is represented by a graph shown in FIG. 26. In consideration of a time constant of the graph shown in FIG. 26, a character M designates an inertial mass and a character G a speed loop gain. Since the inertial mass and the loop gain have known values, the viscosity coefficient D can be calculated by obtaining the time constant in an actual measurement of the step response, and since the step response data can easily be obtained by processing the step response with the time series, the viscosity coefficient D is easily assumed. Namely, the equation (6) is measured and calculated by the adaptive control element 45 shown in FIG. 25 to calculate the viscosity coefficient D in a case where the respective elements or portions of the injection molding machine are suitably adjusted at a starting time thereof, for example. After a lapse of predetermined time, by again measuring and calculating the equation (6), is obtained the variation ΔD with respect to the viscosity coefficient D measured before, and the gain K of the gain element 44 is then obtained from the equation (5). The characteristic represented by the equation (2) is obtained by utilizing this gain K as the gain element 44 and the measuring process can be performed under the same conditions as those at the starting time of the injection molding machine.

Figure 27:
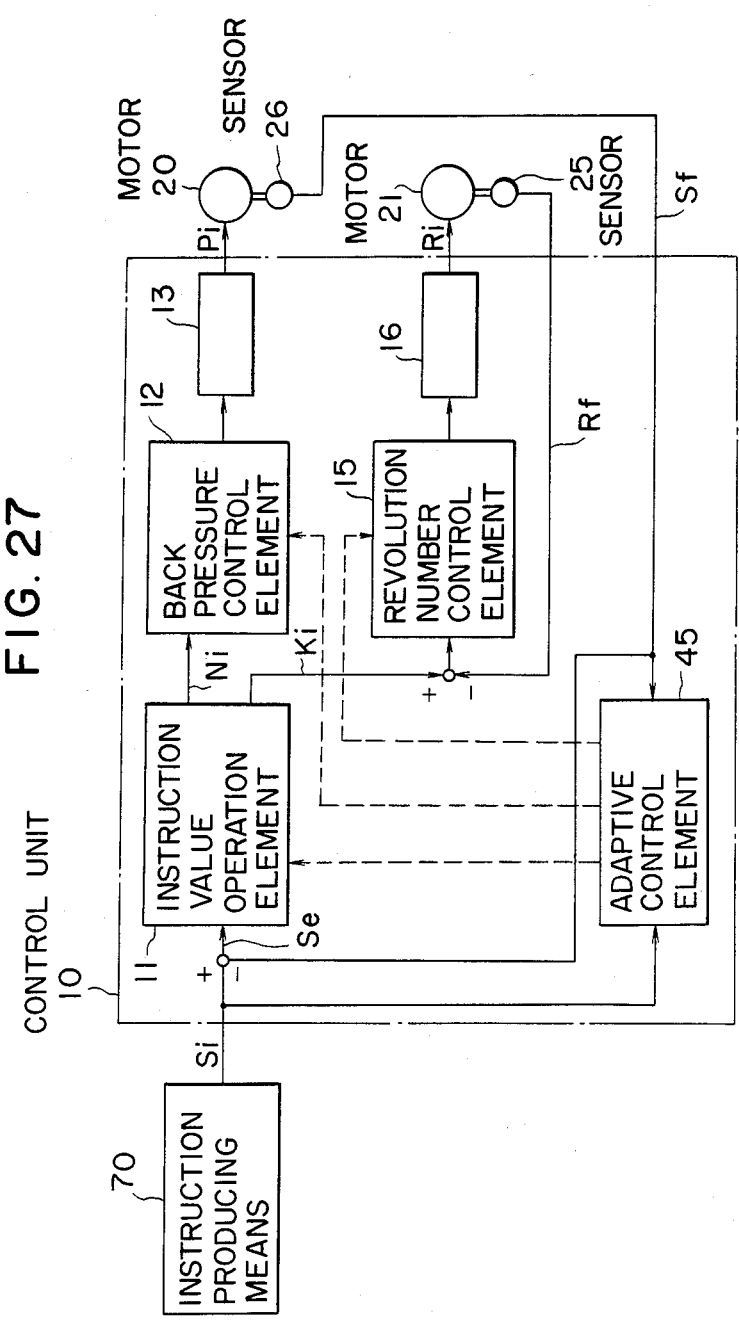
FIG. 27 is a block diagram of a control system in a case where the control method of this invention is applied to the control system shown in FIG. 3.

FIG. 27 shows adaptation of the measurement, calculation and the gain K referred to above to the block diagram of the control system shown in FIG. 3. Referring to FIG. 27, the gain K is first obtained in a manner described above with respect to an adaptive control element 45, and data regarding the gain K are outputted to an instruction value operating element 11, a back pressure control element 12 and a revolution number control element 15, wherein various set values are varied according to the outputted gain K.

According to the control method of this embodiment, the various conditions required for the resin measuring process can be automatically adjusted or set to the most suitable conditions even if the temperature and the moisture of the resin and the plasticized condition thereof are changed thereby to eliminate unnecessary application or reduction of the pressure to the resin being measured at the resin measuring process and prevent the resin from flowing out through the nozzle portion of the heating cylinder and reversely flowing into the hopper. Thus, according to this invention, an injection molding machine capable of carrying out satisfied resin measuring process can be provided.

Figure 28:
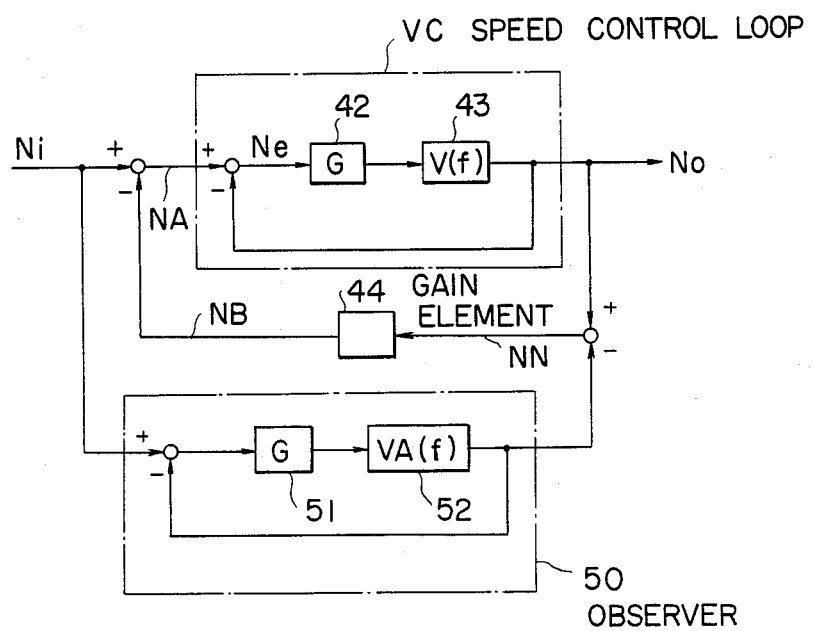
FIG. 28 is a block diagram for explaining another embodiment of the control method according to this invention.

FIG. 28 shows a still further embodiment of a control system for carrying out the control method according to this embodiment, in which is constituted a speed control loop VC in which, by taking into consideration the relationship between the screw speed adjusting input NA and the screw speed output No, the output No is fed back to the input, the deviation Ne between the inputted output No and the input NA is inputted to the speed loop gain 42, and the output from the loop gain 42 is then inputted into the motion control system 43. A signal NN regarding a difference between the speed output No and an observer 50 is inputted to a gain element 44. A signal NB multiplied by a constant number by the gain K of the gain element 44 is fed back to the screw speed instruction Ni and the speed adjusting input NA regarding the deviation between the signals Ni and NB is then inputted to the speed control loop VC. The observer 50 constitutes a speed control loop having the same characteristics as those of the control loop VC by elements 51 and 52 for calculating and measuring the speed loop gain 42 and the motion control system 43, respectively, with an input of the screw speed instruction Ni.

In a theoretical development of the control system having the construction described above, only the viscosity coefficient D due to such as resin in the respective items of the equation (2) is varied in accordance with external conditions such as temperature and the other items regarding the gain G and the inertial mass M are set so as not to substantially be changed. Now supposing that an assumed calculated value of the viscosity coefficient is set to value DD and that a motion control system 52 based on the value DD is set to a function VA(f), the function VA(f) will be referred to as follows in a case where the equation (2) is changed by the external conditions such as change of the temperature.

$$VA(f) = \frac{G}{Ms + DD + G} \quad (7)$$

On the basis of the conditions described above, the relationship between the screw speed instruction Ni and the output speed No of the control system shown in FIG. 28 is calculated as:

$$\frac{No}{Ni} = \frac{G}{Ms + DD + G} \cdot \frac{Ms + DD + G + K \cdot G}{Ms + D + G + K \cdot G} \quad (8)$$

With the equation (8), in case of a large gain K, if the following equations would be established, $$K \cdot G >> D + G \quad (9)$$

$$K \cdot G >> DD + G \quad (10)$$

the equation (8) is represented as $$\frac{No}{Ni} = \frac{G}{Ms + DD + G} \quad (11)$$

Accordingly, since the response of the whole system during the resin measuring process is determined by the equation (11), the measuring process is not affected by the viscosity coefficient D due to the resin in the screw system. In other words, with the equation (11), the gain G and the inertial mass M are set so as not to be influenced by the external conditions and the viscosity coefficient DD is calculated by the assumption, so that the measuring process is not affected at all by the external conditions only by setting the gain K so as to satisfy the conditions supposed by the equations (9) and (10). The observer 50 can carry out an assumed calculation not only by an analog operation but also a digital computer, and the gain K would be determined by the stability and the quick responseness of the system.

In the aforementioned embodiments, the revolution number n of the screw 1 is detected by the sensor 25 operatively connected to the motor 21, but the revolution number n may be detected through gears or by utilizing a motor current, and the position of the drive screw 1 may be detected by the positions of the drive table 24 and the ball nut 23. In addition, a DC or an AC electric motor can availably be used, and the movement of the screw may be performed in combination of the ball screw and the ball nut or by travelling on a guide means under the drive of a motor.

It should be understood that many modifications and adaptations of the invention will become apparent to those skilled in the art and it is intended to encompass such obvious modifications and changes in the scope of the claims appended hereto.

What is claimed is:

1. An injection molding machine of the type in which material resin supplied into a hollow heating cylinder is heated and fed forwardly by a screw which is rotated and reciprocated in said heating cylinder and resin melted and plasticized in said heating cylinder is injected into a mold, comprising:
   instruction producing means for producing an instruction signal indicative of a screw position;
   drive means operatively connected to said screw for rotating and reciprocating said screw, said drive means comprising a first electric motor for rotating said screw and a second electric motor for reciprocating said screw;

means operatively connected to said drive means for detecting a screw revolution number and a screw position, said detecting means comprising a first sensor connected to said first motor for detecting the revolution number of said screw and producing a screw revolution number feedback signal and a second sensor connected to said second motor for detecting the screw position and producing a screw position feedback signal representing back pressure on said screw; and control means which is operatively connected to said drive means and said detecting means and in which said instruction signal, said screw revolution number feedback signal and said screw position feedback signal are inputted, said control means producing in response to both said screw revolution number and said screw position feedback signals a screw revolution number signal which is applied to said first electric motor for rotating said screw and a screw back pressure signal which is applied to said second electric motor for reciprocating said screw so that a signal representing a deviation between said position instruction signal and said screw position feedback signal become substantially zero.

2. The injection molding machine according to claim 1, wherein said control means comprises a position control element into which a signal regarding said deviation between said position instruction signal and said screw position feedback signal is inputted, a speed control element which produces signals regarding back pressure instruction and revolution number instruction in response to an output signal from said position control element, a back pressure control element producing a signal regarding screw back pressure in response to said back pressure instruction, and a revolution number control element producing a signal regarding screw revolution number in response to a signal regarding a deviation between said revolution number instruction signal and said screw revolution number feedback signal.

3. The injection molding machine according to claim 1, wherein said first motor is secured on a drive table which is operatively reciprocated in accordance with the driving of said second motor.

4. The injection molding machine according to claim 3, wherein said drive table is operatively connected to a ball nut member engaged with a ball screw connected to a drive shaft of said second motor, thereby reciprocating said drive table in accordance with the driving of said second motor.

5. The injection molding machine according to claim 3, wherein said second sensor is mounted to said drive table.

6. The injection molding machine according to claim 1, wherein said instruction producing means further produces a revolution number instruction signal.

7. The injection molding machine according to claim 6, wherein said control means comprises a back pressure control element producing a signal regarding a screw back pressure in response to an inputted deviation signal between said position instruction signal and said screw position feedback signal, and a revolution number control element producing a signal regarding a screw revolution number in response to an inputted deviation signal between said revolution number instruction signal and said screw revolution number feedback signal.

8. The injection molding machine according to claim 7 wherein said revolution number instruction signal is constant.

9. The injection molding machine according to claim 1, wherein said instruction producing means further produces a screw back pressure instruction signal.

10. The injection molding machine according to claim 9, wherein said control means comprises a back pressure control element producing a signal regarding screw back pressure in response to said screw back pressure instruction signal, a position control element into which a signal regarding a deviation between said position instruction signal and said screw position feedback signal is inputted, and a revolution number control element producing a signal regarding screw revolution number in response to a deviation signal between the output signal from said position control element and said screw revolution number feedback signal.

11. The injection molding machine according to claim 10 wherein said screw back pressure instruction signal is constant.

* * * * *